(12) United States Patent  (10) Patent No.: US 6,504,338 B1
Eichorn                    (45) Date of Patent:    Jan. 7, 2003

(54) CONSTANT CFM CONTROL ALGORITHM FOR AN AIR MOVING SYSTEM UTILIZING A CENTRIFUGAL BLOWER DRIVEN BY AN INDUCTION MOTOR

(75) Inventor: Ronald L. Eichorn, Soquel, CA (US)

(73) Assignee: Varidigm Corporation, Plymouth, MN (US)

( * ) Notice: Subject to any disclaimer, the term of this patent is extended or adjusted under 35 U.S.C. 154(b) by 0 days.

(21) Appl. No.: 09/904,428

(22) Filed: Jul. 12, 2001

(51) Int. Cl.⁷ ................................................ H02P 7/50
(52) U.S. Cl. .................. 318/727; 318/798; 318/799; 318/802; 318/805; 318/811; 318/519; 388/929; 388/930; 417/18; 417/20; 417/22; 417/44.1; 417/44.11; 417/45; 236/DIG. 9
(58) Field of Search ................................ 318/727, 798, 318/799, 802, 805, 599, 811; 388/929, 930; 417/18, 20, 22, 44.1, 44.11, 45; 236/DIG. 4

(56) References Cited

U.S. PATENT DOCUMENTS

| 4,648,551 A | * | 3/1987 | Thompson et al. | 236/49 |
|---|---|---|---|---|
| 4,978,896 A | | 12/1990 | Shah | 318/254 |
| 5,202,951 A | | 4/1993 | Doyle | 388/811 |
| 5,313,548 A | | 5/1994 | Arvidson et al. | 388/800 |
| 5,447,414 A | | 9/1995 | Nordby et al. | 417/20 |
| 5,473,229 A | | 12/1995 | Archer et al. | 318/254 |
| 5,492,273 A | | 2/1996 | Shah | 236/44 A |
| 5,506,487 A | | 4/1996 | Young et al. | 318/811 |
| 5,520,517 A | * | 5/1996 | Sipin | 417/44.3 |
| 5,552,685 A | | 9/1996 | Young et al. | 318/254 |
| 5,592,058 A | | 1/1997 | Archer et al. | 318/254 |
| 5,675,231 A | | 10/1997 | Becerra et al. | 318/801 |
| 5,709,533 A | | 1/1998 | Dias | 417/18 |
| 5,736,823 A | | 4/1998 | Nordby et al. | 318/432 |
| 5,806,440 A | * | 9/1998 | Rowlette | 110/162 |

* cited by examiner

*Primary Examiner*—Robert E. Nappi
*Assistant Examiner*—Rina I. Duda
(74) *Attorney, Agent, or Firm*—Pauley Petersen Kinne & Erickson

(57) ABSTRACT

A method and apparatus for achieving constant air flow rate economically utilizes an induction blower motor with control settings determining the motor excitation voltage. A memory stores, for a variety of motor speeds, a graph of the speeds plotted against a proportionality constant of flow rate to fan speed for the selected motor system on one axis and motor control settings on the other axis. The only monitoring necessary to achieve the constant flow rate is thus the sensing of fan rotational speed. The measured fan speed is compared against the proportionality constant needed for the selected constant air flow rate and a motor excitation voltage is derived to achieve that proportionality constant. When the system load changes significantly, thereby causing significant fan speed change, a cascaded control loop is used whereby the speed changed induced by each control voltage adjustment is monitored until the desired constant flow rate is again attained at the new load level.

14 Claims, 9 Drawing Sheets

CONSTANT CFM CONTROL ALGORITHM FOR AN AIR MOVING SYSTEM UTILIZING A CENTRIFUGAL BLOWER DRIVEN BY AN INDUCTION MOTOR

BACKGROUND OF THE INVENTION

1. Field of the Invention

The present invention relates generally to controls for induction motors used in constant mass air flow, sometimes also called constant CFM (cubic feet per minute), applications.

2. Discussion of the Related Art

In modern heating systems, it is sometimes desirable to regulate the amount of air flow through the heat exchanger to a constant CFM volume. References addressing air flow control by a motor driven blower system are known to exist. The reader is referred to U.S. Pat. No. 5,736,823, to Norby et al.; and U.S. Pat. No. 5,202,951, to Doyle; for examples of the known art.

Generally the constant mass air flow blower controls of the known art may require fan speed sensing, motor current sensing, torque calculations, or some combination of the above which may make the systems expensive in terms of the sensing apparatus, mathematical processing power and the like. Such control systems may also incur time delays during control calculation.

Known examples of control systems in the art may otherwise rely on an assumption of a linear relationship between fan, or motor, speed and mass air flow. While a degree of linearity may be achieved in certain systems with expensive variable speed controllers such as a pulse width modulated (PWM) controller, the attendant cost may be prohibitive. Also, for readily available and inexpensive induction motor driven systems the above assumption of linearity does not hold true, and systems based on this assumption may not yield adequate control stability or performance with or without more expensive electronic motor controllers, resulting in operation which is not optimally smooth or quiet.

Therefore to solve the shortcomings of the known art, there is needed an inexpensive motor control system for induction motors utilized in constant mass air flow systems.

SUMMARY OF THE INVENTION

The present invention provides an inexpensive and reliable constant mass air flow controller for induction motor driven blower systems. The present system requires monitoring only of the blower, i.e. fan or motor, speed in conjunction with a motor controller which does not assume linearity of speed, motor control voltage and flow rate.

Instead, according to the present invention, the controller is provided with a look up table covering the operating range of the motor, which is accessible by the motor controller processor. The look up table contains a family of fairly straight curves for several motor speeds plotted against proportionality constants of air flow rate to fan speed on one axis and the control voltage settings on the other axis.

In order to select the proper motor control voltage setting, the motor controller compares the measured speed of the motor, or fan, of the blower (hereinafter referred to as just "motor" or "fan" synonymously) against the control voltage setting to derive the proportionality constant known to give the proper mass air flow. The controller then derives the proper motor speed, or "RPM setpoint", to achieve the desired mass air flow. The excitation voltage is then increased or decreased to achieve the proper motor speed. The control voltage setting will sometimes also be referred to as a "control point" or "control setting" since voltages may not be directly represented under the scheme of excitation used to control the motor, as will be understood by the person of ordinary skill in the art.

A cascaded control loop is used for the motor controller of the invention to attain a constant mass air flow. The outer loop of the cascade control has an input of the selected constant CFM rate and an output of the RPM setpoint to the inner control loop. The inner control loop has an input of the RPM setpoint and outputs to the outer loop the control voltage setting when the RPM setpoint is achieved.

The outer loop uses the measurement of the motor speed and reported control voltage at that speed to derive a proportionality constant of the system operation for that motor speed. The proportionality constant contains the air flow information necessary to select the next RPM setpoint for operation of the motor to achieve the selected constant CFM mass air flow. If necessary, a new RPM setpoint is selected, and the control voltage adjusted, to increase or decrease fan speed to achieve the desired air flow; with a rechecking of the proportionality constant for the new fan speed attained under the given system load. Iterative adjustment of the RPM setpoint is performed until the desired mass air flow is reached.

The system relies on the fact that for a constant system load, flow rate is proportional to fan speed. Because the system load for a blower motor generally remains constant and changes by a significant amount only occasionally, the system need only monitor the motor rotational speed, which is a function of the system load, and check the motor speed and voltage control point to derive the proportionality constant. The selected CFM value is then divided by the proportionality constant and used to select the next RPM setpoint for the motor and the control voltage is changed accordingly. During most periods of use little adjustment is needed, so the motor controller may monitor speed changes at a long time constant, or may operate with a lower allowable system adjustment, or "gain", to make sure small transients in motor speed do not affect system stability. When the system load changes significantly, thereby causing significant fan speed change or control voltage adjustments, a short time constant for the control loop is used whereby the RPM setpoint and control voltage adjustment occur more frequently until the desired constant mass air flow rate is again attained at the new load level under a new control voltage.

By using the cascade control loop algorithm of the present invention minimal hardware is required since the cascade control is merely a software implementation. Also, direct control of the motor speed removes speed variations due to drifts in motor temperature, line voltage, air temperature, etc. The lookup table storage for motor/fan characteristics of the present invention promotes efficiency of operation since the family of control curves tends to be close to a set of straight lines. The addition of the adaptive control in the outer loop of the control for the present invention will provide very stable motor control that is responsive to system load variations.

BRIEF DESCRIPTION OF THE DRAWINGS

A preferred embodiment of the invention is described below along with the appended drawing figures in which.

DESCRIPTION OF THE PREFERRED EMBODIMENTS

Figure 1:
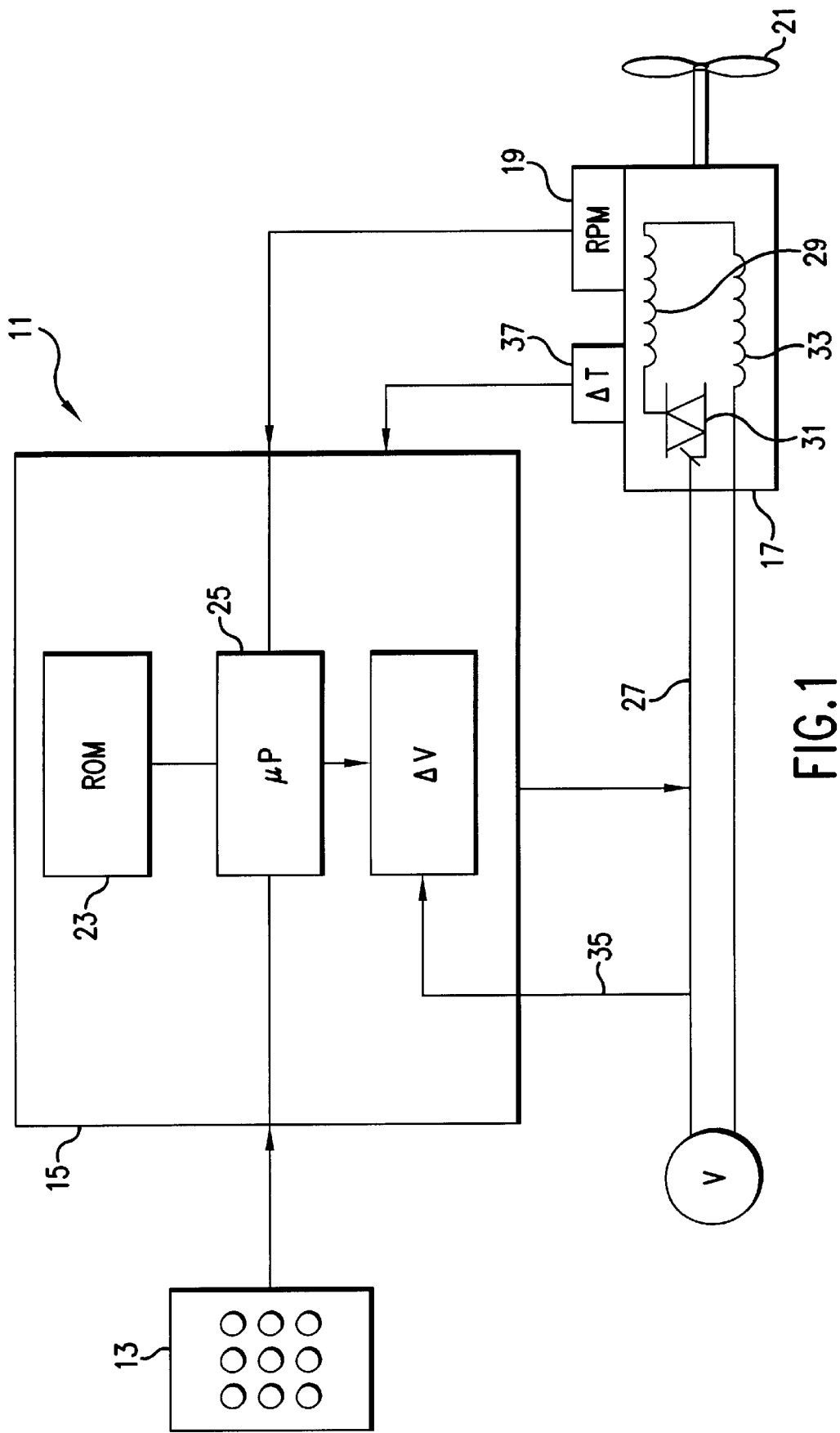
FIG. 1 is a schematic representation of apparatus suitable for practicing certain embodiments of the present invention.

In modern heating systems, it is sometimes desirable to regulate the amount of air flow through the heat exchanger to a constant CFM volume. FIG. 1 depicts one embodiment of the present invention which is suitable to achieve this purpose economically by utilizing inexpensive components, such as an induction motor with triac speed control. As illustrated, the basic components of the present CFM system 11 include a flow selector 13, a motor controller 15, a motor 17, a speed sensor, or tachometer, 19 and a fan 21.

The present control method requires only a sensing of the motor speed in conjunction with the algorithm of its cascade control scheme. Low cost apparatus known in the art are readily available to accomplish this speed sensing purpose. It is important to note that since air flow is directly proportional to fan speed, the system accuracy will depend on how accurately motor speed is measured.

Figure 2:
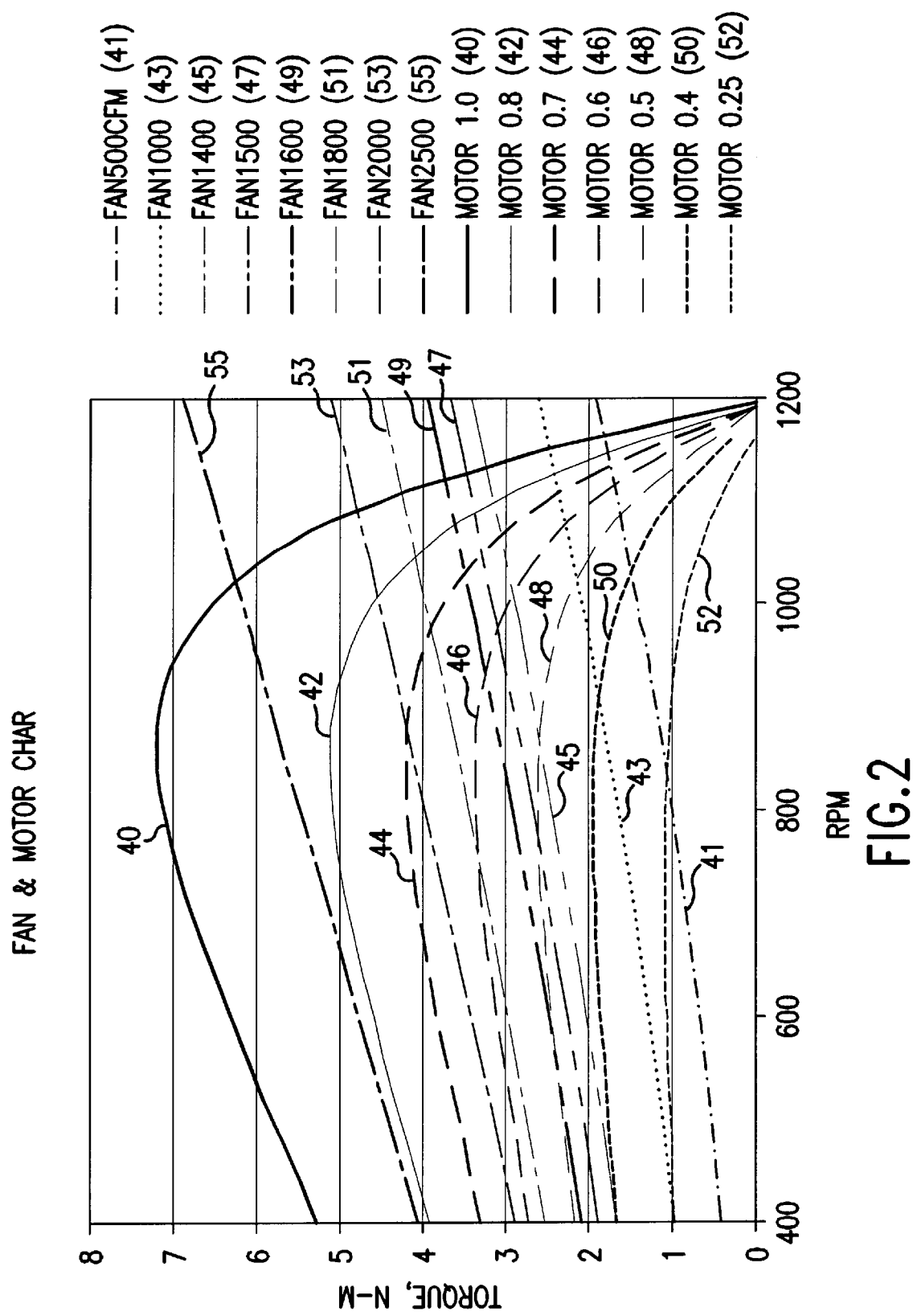
FIG. 2 is a graph of motor and fan speed/torque characteristics of an induction motor blower system which may be selected for use in a system according to the present invention
Figure 3:
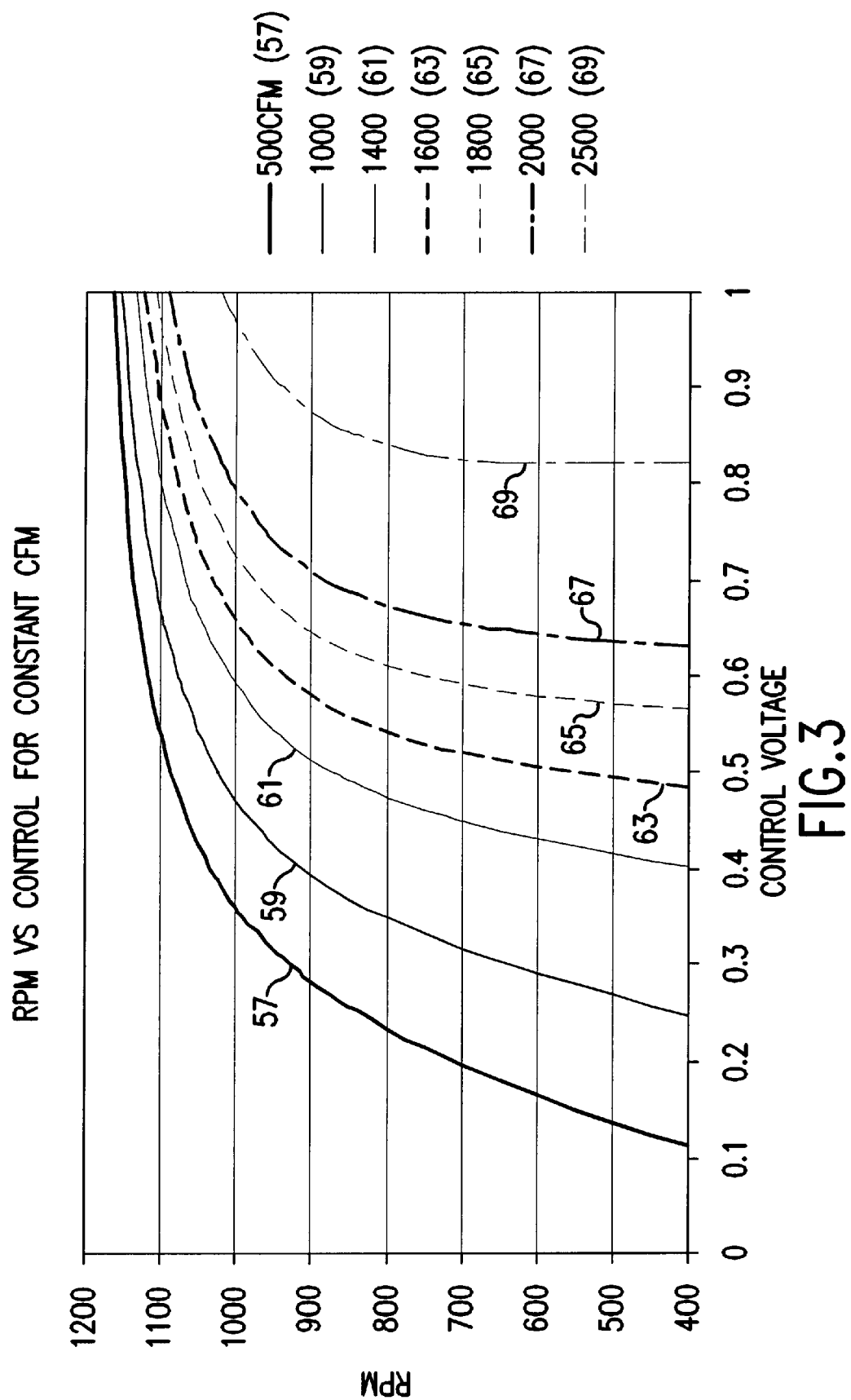
FIG. 3 is a graph of CFM air flow characteristics for the selected induction motor system plotted against motor speed and control voltages for the motor.

The air flow control depends on knowing the speed-torque characteristics of the selected motor for any particular control voltage supplied to the motor. The fan characteristics of torque versus speed for constant air flow can be can be determined from the manufacturer's performance curves (FIG. 2). The points where the very flat fan curves of constant air flow intersect the motor speed/torque curves will yield a set of curves for motor control voltage versus speed for constant air flow (FIG. 3). It will be appreciated that airflow is determined by motor speed and motor control voltage. Both of these quantities are accurately known, from the tachometer and the fact that the motor controller 15 generates the control voltage. The system load will effect the overall speed of the motor under a given control voltage.

The examples herein were derived using analytical techniques. Motor characteristics were generated from an equivalent circuit model using Mathcad™. software, from MathSoft, Inc. of Cambridge, Mass. The motor modeling closely simulated a standard three-quarter horsepower 1075 RPM induction motor. The triac control illustrated in FIG. 1 may yield slightly different results compared to the linear voltage control model utilized in the analysis set forth herein. Speed/torque characteristics were generated by modeling a varying AC voltage applied to the main winding of the motor. Fan characteristic were taken from graphical data supplied by the manufacturer for a Lau Industries, Inc., of Dayton Ohio, Model DD10-10A centrifugal fan. It was assumed that the standard ideal fan laws apply within the intended operating conditions of this device.

FIG. 2 shows both the motor and the fan speed/torque characteristics on the same plot. The control input variable for variable speed motor control, used by way of example in the illustrated embodiment of FIG. 1, is the ratio of the main winding 29 excitation voltage, as controlled by a triac 31, to the auxiliary winding 33 voltage excitation. The control voltage input variable varies in value from 0 to 1. The auxiliary winding voltage is a constant line voltage 115 V. Thus, a control input of 0.5 means that the auxiliary is excited with 115 V and the main winding is excited with 57.5V. Motor excitation curves between input control points of 1.0 and 0.25 are labeled with even reference numbers 40–52 with specific values as seen on the right of the graph of FIG. 2. Blower CFM curves are labeled with odd reference numbers 41–55 for specific values between 500 CFM and 2500 CFM as seen on the right of the graph of FIG. 2.

The fan curves seen in FIG. 3, which are a family of curves representing constant airflow in CFM, were generated by first graphically extracting the data from the manufacturers performance curves. Using Excel™ software from Microsoft, a curve fit was obtained for each constant air flow data set using a second order equation. This provided for smoothing of the data errors produced by taking the data from a graph, and additionally provided a means by which the fan curves could be entered in to Mathcad™. With these curves in Mathcad™, the intersections of motor and fan characteristics were determined. This results in the set of curves seen in FIG. 3, which show the control voltage, or control point, (X axis) versus speed characteristics, or RPM (Y axis) for constant air flow in the system between values of 500 CFM to 2500 CFM, labeled with odd reference numbers 57–69 for the specific values seen on the right of the graph of FIG. 3.

A visualization of one control strategy thus becomes conceptually simple. One could provide a means by which the curves of FIG. 3 can be stored and accessed by the motor controller 15. Upon receiving an input variable, such as an operator's input through flow selector 13, representing desired air flow, the motor controller 15 must vary the control voltage, as represented by control line 27 until the RPM, i.e., motor speed, measurement and control voltage converge to the desired air flow. However, there are several issues involved in this control strategy. Among them are calculation time and memory requirements, the control stability, and errors due to power line variation and temperature.

Referring again to FIG. 2, it is observed that in the lower RPM ranges, i.e. less than about 850 RPM, the curves of constant air flow are nearly parallel to the motor torque curves. One might think that control stability could be compromised in this operating region since the curves do not intersect at a well defined point, such as they do beyond the motor torque peak. However, this operating region is not so problematic when one considers that as the control voltage to the motor is varied the speed will vary according to the system load line, whereas the torque varies with the square of speed.

Figure 4:
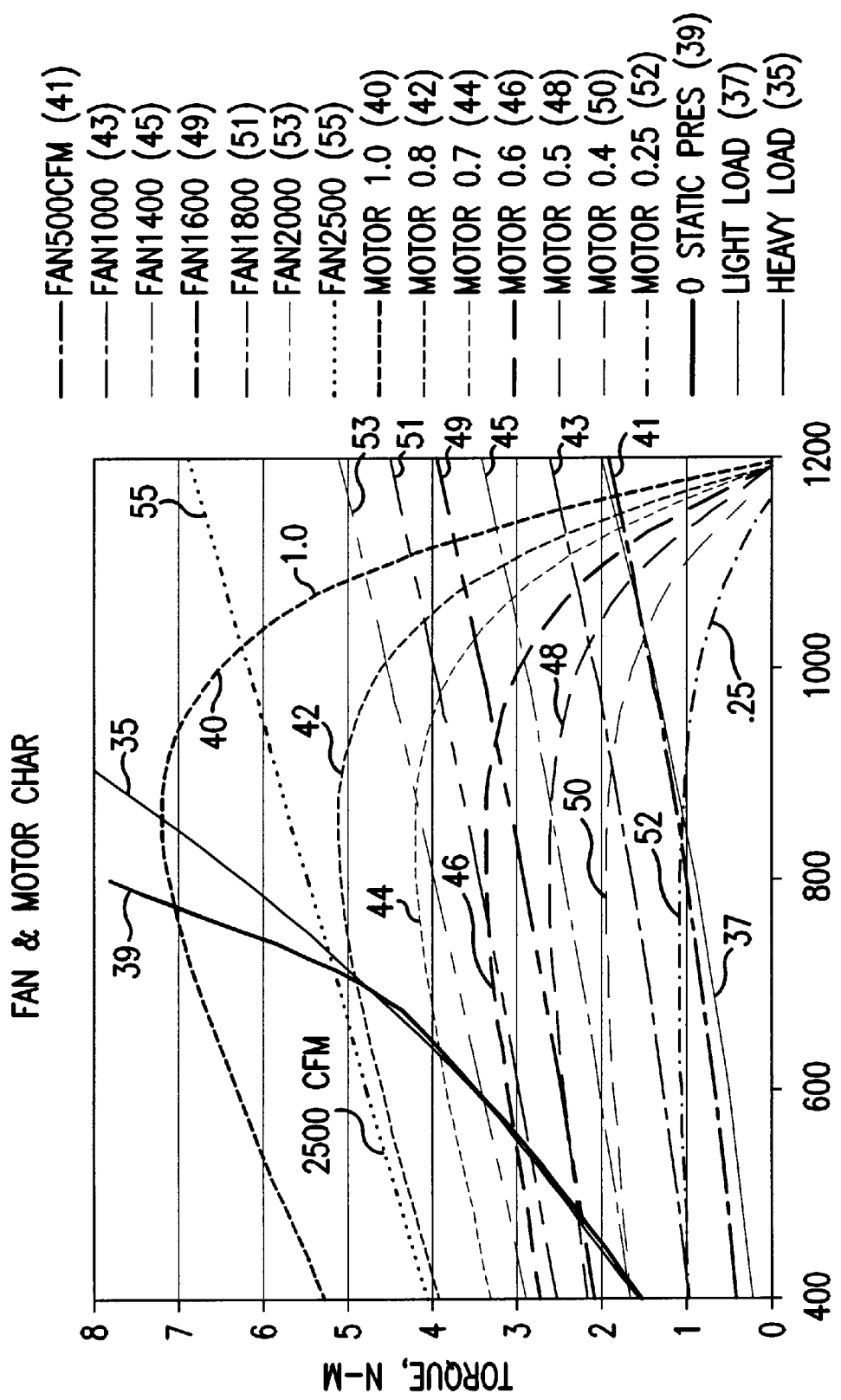
FIG. 4 is a graph similar to the graph of FIG. 2 with various system load lines also plotted thereon.

FIG. 4 shows system load lines added to the plot of FIG. 2 (minus the curve 47 for 1500 CFM). The first load line 35 shows a system with a heavy load, i.e. very little restriction in the system resulting in a high flow rate. The second load line 37 is a light load, with a restricted flow. The third load line 39 was taken from the fan performance curves at zero static pressure. The system cannot operate above and to the left of this line. It will be observed that for a heavy load, the first load line 35 crosses both the dotted constant air flow lines and the solid motor torque curves at a reasonable angle. This is consistent with the known experience that the speed of an induction motor is most easily controlled when it is heavily loaded. In FIG. 4, it may be further observed that the second load line 37 of a lightly loaded system closely follows the constant air flow curve of the 500 CFM curve, reference number 41, particularly above about 900 RPM. It is in this area that control stability might be difficult to achieve since the motor RPM can vary over a wide range without inducing a corresponding change in the CFM output. Put another way, the requirement of nearly constant CFM can be satisfied over a wide motor speed range. But, although the CFM control might be adequate over such a range, the possibility of rapidly varying motor speed due to lack of fixed control points could be annoying.

The stability problem can be solved by considering the fan laws, which state that, for a constant system load, flow rate is directly proportional to fan speed. The fan laws thus tell us that when the system load changes the fan speed will, or must, change to maintain a constant CFM. A control implementation for an induction motor with nonlinear behavior can thus make use of this law by storing the proportionality constants of flow rate to fan speed over the operating range of the selected fan/motor components, and controlling the motor RPM according to the proportionality constant for that speed, to achieve the selected quantity of mass air flow.

Figure 5:
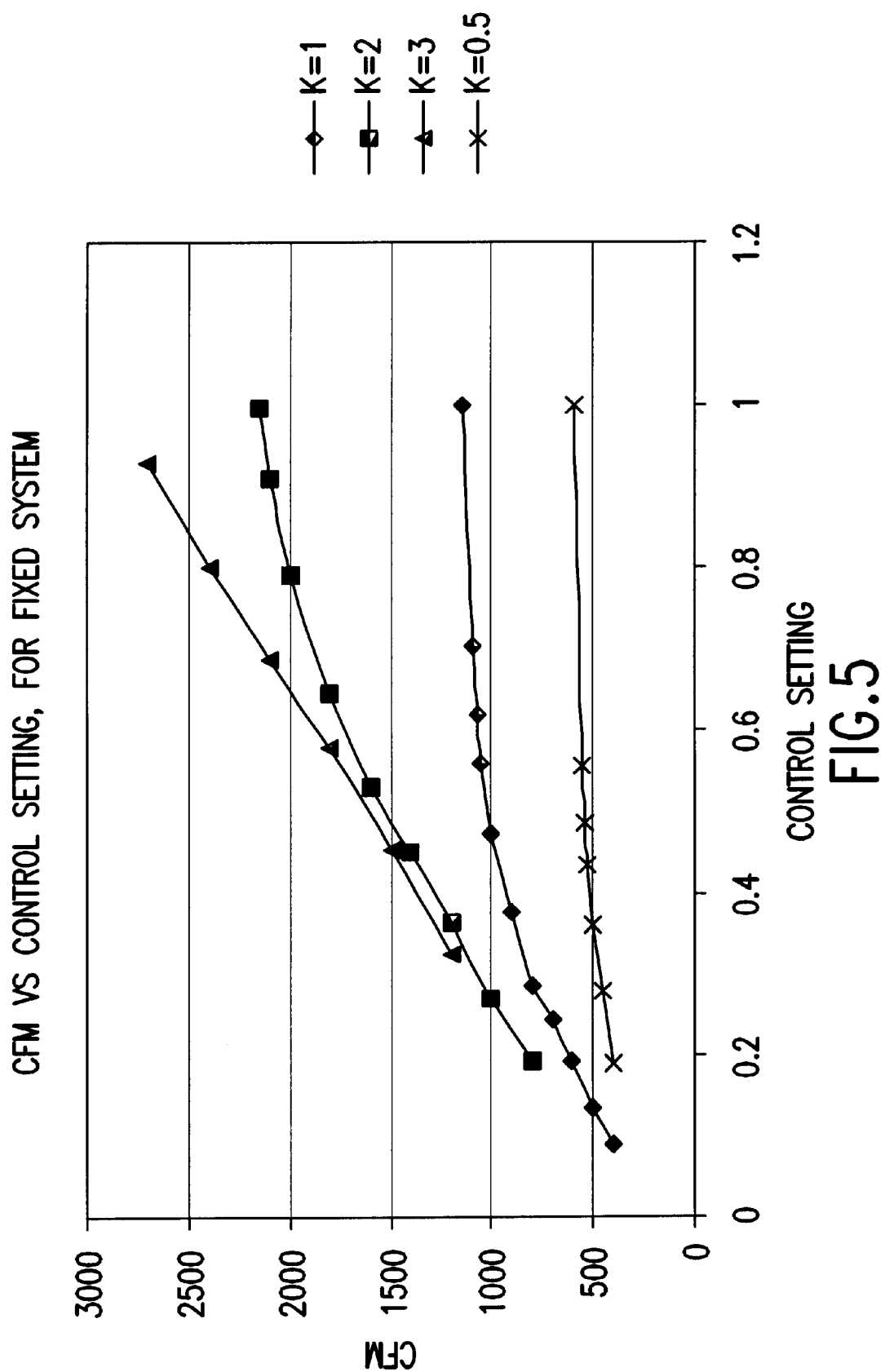
FIG. 5 is graph of CFM versus voltage control setting used for explanatory purposes.
Figure 6:
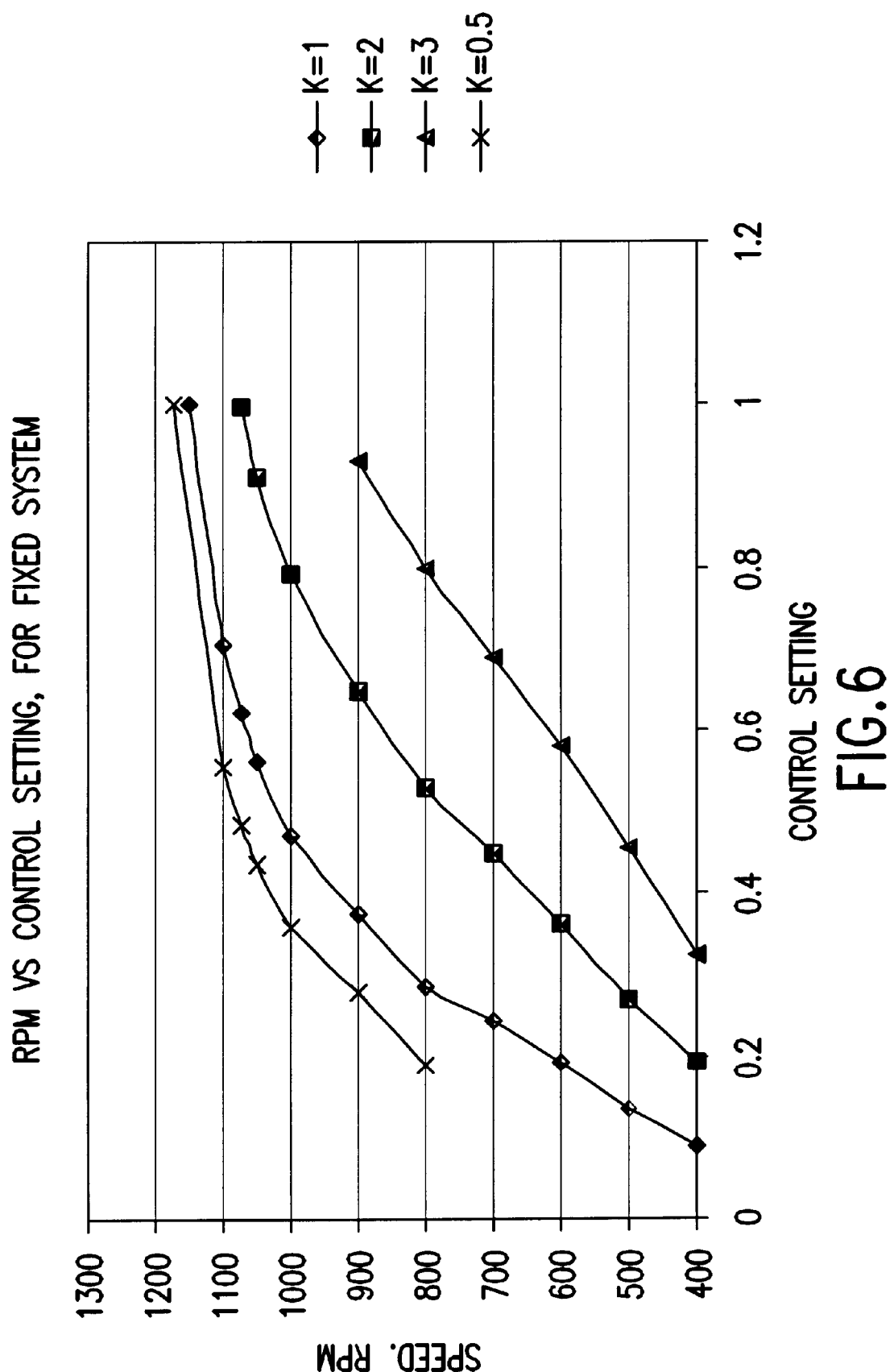
FIG. 6 is graph of motor speed versus voltage control setting as seen by the inner control loop of the cascade control system of the present invention.

Referencing FIGS. 5 and 6, the graphs therein help to demonstrate one advantage of using the cascade control loop of the present invention instead of a direct, one loop, CFM control. The FIG. 5 plot graphs the CFM value on the Y axis versus control voltage setting on the X axis for various system constants (K). These lines could be used as a nonpreferred direct control loop that would directly try to control the motor to an air flow setpoint. For a heavily loaded system (K=3) this would not represent a problem, as there is a linear response of air flow to control setting. On the other hand, in a lightly loaded system, represented by K=0.5, e.g. all the dampers closed, the line becomes very flat. One would get just a little over 500 CFM for any control setting between 0.5 and 1. The motor speed could conceivably drift greatly with small system variations, e.g. motor temperature, air temperature, etc. Such a control loop could satisfy the requirement for CFM control, but motor speed variations might be very annoying.

The FIG. 6 plot shows a graph of motor speed in RPM, plotted on the Y axis, versus control voltage settings, plotted on the X axis, for four different system constants (K). This is the characteristic information seen by the "inner" cascade loop of the present invention as further explained below. While FIG. 6 also shows some "flattening" for the unloaded system (K=0.5), it is not nearly so severe. It should also be noted that RPM on the Y axis is a direct, accurate measurement of the actual system, and not dependant on another system variable such as motor or air temperature. Therefore, a speed control inner loop of the cascade control will still have the ability to control speed reasonably well, avoiding annoying speed variations.

Figure 7:
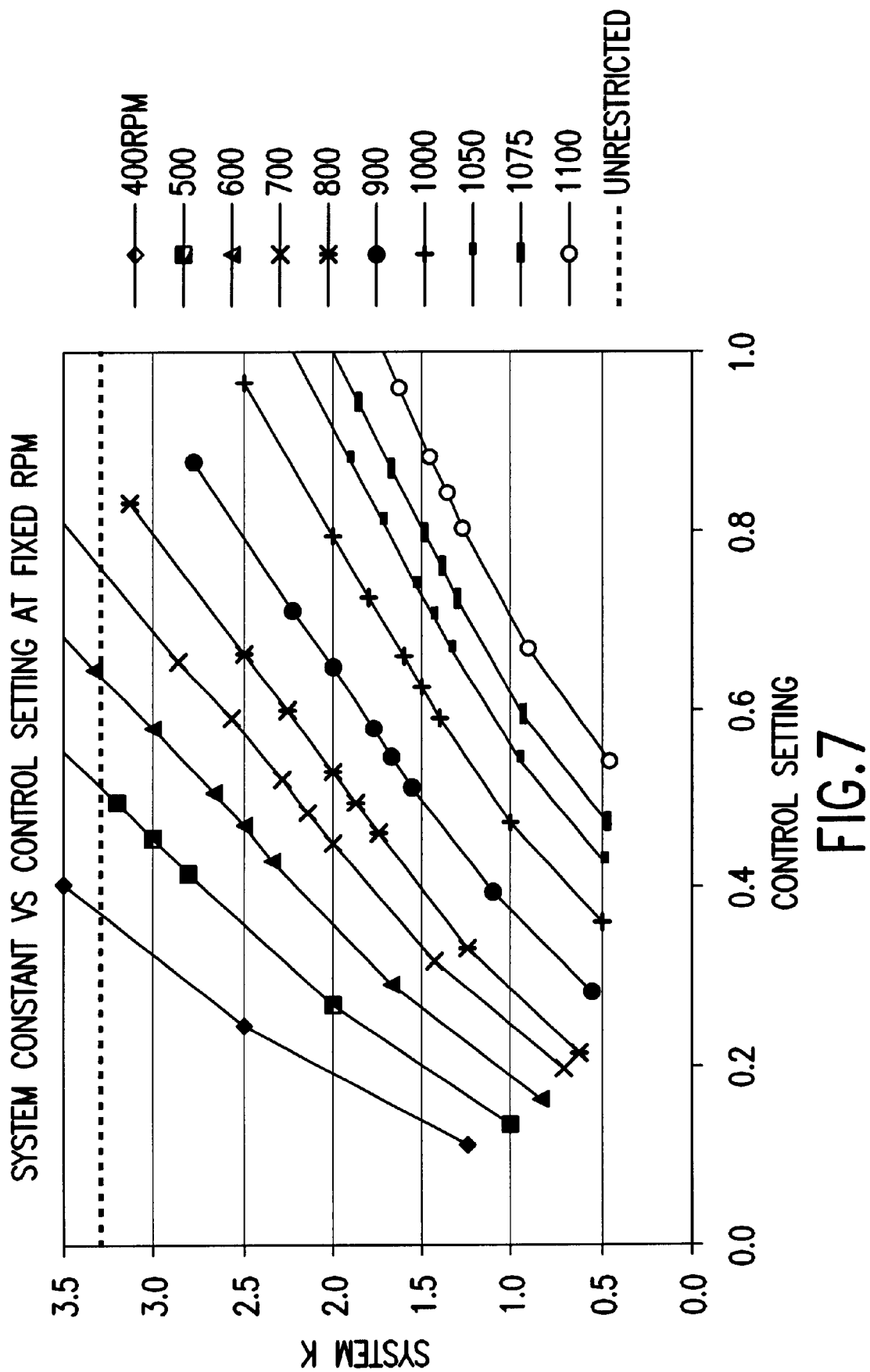
FIG. 7 is a graph of motor speed curves for the induction motor plotted against the control voltages and the air flow rate-to-fan speed proportionality constants of the selected system.

FIG. 7 shows the curves for several given motor speeds between 400 RPM and 1100 RPM, with specific values listed to the right of the graph, plotted against the proportionality constants (Y axis) and motor control inputs (X axis) determined for the selected blower system. The maximum system constant for this fan is 3.3, as shown by the dotted line. This would represent a fan sitting in open air with no restrictions, resulting in maximum possible air flow, i.e. zero static pressure. Practically, this motor/fan combination would not be used in a system where the constant exceeded 3 because at full power the motor would likely be overloaded and overheat.

Fortuitously, this family of system constant versus control setting curves is a set of nearly straight lines. Thus, use of simple lookup tables, stored in the motor controller 15, e.g., in ROM 23, can be used in combination with linear equations, if necessary for interpolation, to derive an appropriate proportionality constant for a selected constant mass air flow, and will be easier and quicker to implement with a microprocessor 25 than the control voltage/speed curves of FIG. 3.

The system load in a heating system is typically constant, with only occasional abrupt changes due to opening and closing of dampers. Thus a cascade control loop can be used, with the outer loop having an input of the selected CFM value; and the inner loop having a speed control input from the outer loop. The cascade control loop of the described embodiment has the inner loop being a speed control loop, and the outer loop being the CFM control loop. The outer loop supplies an RPM setpoint by deriving a system constant from the currently known control voltage value and the currently measured fan speed value. The selected CFM value is then divided by the derived system constant to derive the new RPM set point. The new RPM set point is then provided to the inner loop.

The new fan speed value, or RPM set point, is then provided to the inner control loop. The inner control loop steps the control voltage value up or down and compares measured fan speed to the new RPM set point. When the measured fan speed equals the new RPM set point, the current control voltage value is reported back to the CFM control loop, a new RPM set point is calculated, and the fan speed/control voltage is again adjusted, and so on iteratively until the system constant and the fan speed are in the proper control range.

By way of an example, suppose an air flow of 1200 CFM is required from the blower system. The system is turned on from a full stop. When the system is turned on, the CFM control loop provides an arbitrary RPM setpoint to the speed control loop, of e.g. 400 RPM. The speed control loop raises the control voltage until a fan speed of 400 RPM is measured. At this time, the voltage control setting to maintain 400 RPM is known, and reported to the CFM control loop. A system constant is then calculated from the measured speed and control voltage value, as from the graph of FIG. 6. By way of example, the voltage control setting is found to be 0.193, and the system constant (K) is then calculated for the 400 RPM speed to be 2.00.

The CFM control loop can now calculate the desired speed as: RPM=CFM/K. Where CFM is 1200 and K is 2.00, the desired RPM is 600. The CFM control loop thus raises the RPM set point and delivers it to the speed control loop. The CFM control loop could raise the RPM setpoint to the full 600 RPM, but this might not be prudent since there could be a small error due to accuracy of the curve fitting or other minor variables in the system as the system constant changes with fan speed. Therefore, the CFM control loop may, in one embodiment of the invention, place the RPM setpoint at one half the difference between the present speed and the desired speed, which in this case would be 500 RPM.

When 500 RPM is reached as measured by the tachometer, the voltage control setting is again reported to the CFM control loop. Suppose that the voltage control setting value at 500 RPM is now 0.265. A new system constant is calculated for the 500 RPM motor operation, and found to be 1.975. The new desired RPM setpoint is then calculated to be 608 RPM. Using the same algorithm as before, the CFM control loop sets the RPM setpoint halfway to the desired final speed, which would be 554 RPM. This process now continues, until the speed converges to a value which produces only an acceptable error between the desired RPM and the actual RPM. For our example, the final voltage control setting is 0.352, resulting in a speed of 605 RPM and a calculated system constant (K) of 1.984.

Essentially the described algorithm will follow the order of:

| START |
| --- |
| 1. enter CFM value (e.g., 1200 CFM) |
| 2. set arbitrary RPM1 value (e.g., 400 RPM) |
| 3. step control voltage (CV) up until RPM1 is measured at tachometer |
| 4. derive system constant K1 for current CV and RPM1 |
| 5. divide CFM value by K1 to derive RPM2 value |
| 6. subtract RPM2 − RPM1 to derive RPM3 |
| 7. divide RPM3 by 2 and add to RPM1 to get RPM4 (i.e. half step) |
| 8. step CV up until RPM4 is measured at tachometer |
| 9. derive K2 for current CV and RPM4 |
| 10. divide CFM value by K2 to derive RPM5 value |
| 11. iteratively step up CV, measure RPM and half step through RPM values until RPM value and K balance at CFM value. |

Preferably there is some intelligence provided in the CFM control loop. As long as there is not an unacceptable error in the provided constant CFM air flow, the CFM control loop should not change the RPM setting. This will reduce annoying speed changes which might come with minor drift and noise in the system, while still controlling constant CFM air flow within a desired tolerance. This is especially true in the operational areas of the motor where CFM flow does not change much over a wide speed range. If a CFM error outside the allowed error band is observed, the CFM control loop could then command a new speed setpoint. This is sometimes referred to as "adaptive" control.

In continuing our control example, suppose a damper is now closed, restricting the volume of air which may be moved through the system for a given time. In order to maintain constant CFM the air flow must increase and the fan, being unloaded to some degree, will speed up. It is again noted that the fan system here is the centrifugal fan typically used in most home furnace applications. The speed control loop will however, decrease the control voltage to try and maintain the setpoint of 605 RPM. The faster fan speed and lowered control voltage value are reported to alert the CFM control loop. The CFM control loop may see either of these occurrences as a sudden decrease in the system constant and command the speed control loop to increase the speed. A new, lower, system constant is derived for the fan speed and decreased control voltage, thus leading to a new higher RPM value.

For example, the voltage control setting drops to 0.269 to maintain 605 RPM. The system constant is then 1.50, and the airflow has dropped to 907 CFM at the maintained 605 RPM. This is outside the allowed error band. Air velocity must increase to move the same volume of air, i.e. 1200 CFM, though the now restricted space. The CFM control loop calculates the new desired speed setting to be 800 RPM. The CFM control loop uses the same algorithm as previously described, moving the RPM setpoint half the difference to 702 RPM. The controller then iterates until finally achieving zero error at 700 RPM, with a system constant of 1.50. The voltage control setting is now 0.397.

The controller 15 increases or decreases the control voltage, or signal, to the motor 17, which in the illustrated embodiment of FIG. 1 controls the switching of the triac 31, in order to achieve the desired RPM speed of the motor/fan, as provided by the outer loop. Iterations of the control loop cycle will take place until the fan speed is within the desired tolerances to achieve the desired constant mass air flow.

Adaptive filtering may be applied to the inner loop to insure that the proportionality constant of the control system is allowed to change only very slowly during normal operation, and more rapidly when an abrupt change in RPM indicates a major load transient such as a damper change. Thus the microprocessor 25 would not normally have to access the lookup tables containing the proportionality constants very rapidly.

Adequate processing power, including calculation time and memory requirements, is commercially available for this control solution, with the design choice left to the person of skill in the art to select the components and balance these requirements against the lowest cost. The cascade control implementation discussed above is believed to be achievable in a low cost processor.

Thus a summary of the advantages of the cascade control loop according to the present invention may include: no extra hardware requirements because the cascade control is merely a software implementation; no annoying speed variations of the motor due to direct control of the speed; lookup table storage for the motor/fan characteristics is easier since the family of curves tends to be closer to a set of straight lines; the overall processing power required is reasonable; and the addition of the adaptive control in the outer loop should provide very stable control that is still responsive to system load variations.

Additional considerations for certain embodiments of the present invention may include power line supply variations and temperature variations to be accounted for to ensure that a constant CFM flow is maintained. The motor torque may be highly sensitive to line power. Since constant CFM control is ultimately based on assumptions concerning the motor torque, it may be desirable that correction for line voltage be supplied, as indicated in FIG. 1 at reference number 35. Line voltage is not difficult to measure, but may require the addition of a low cost analog to digital converter (ADC), which may possibly be integrated into the selected microprocessor.

Figure 8:
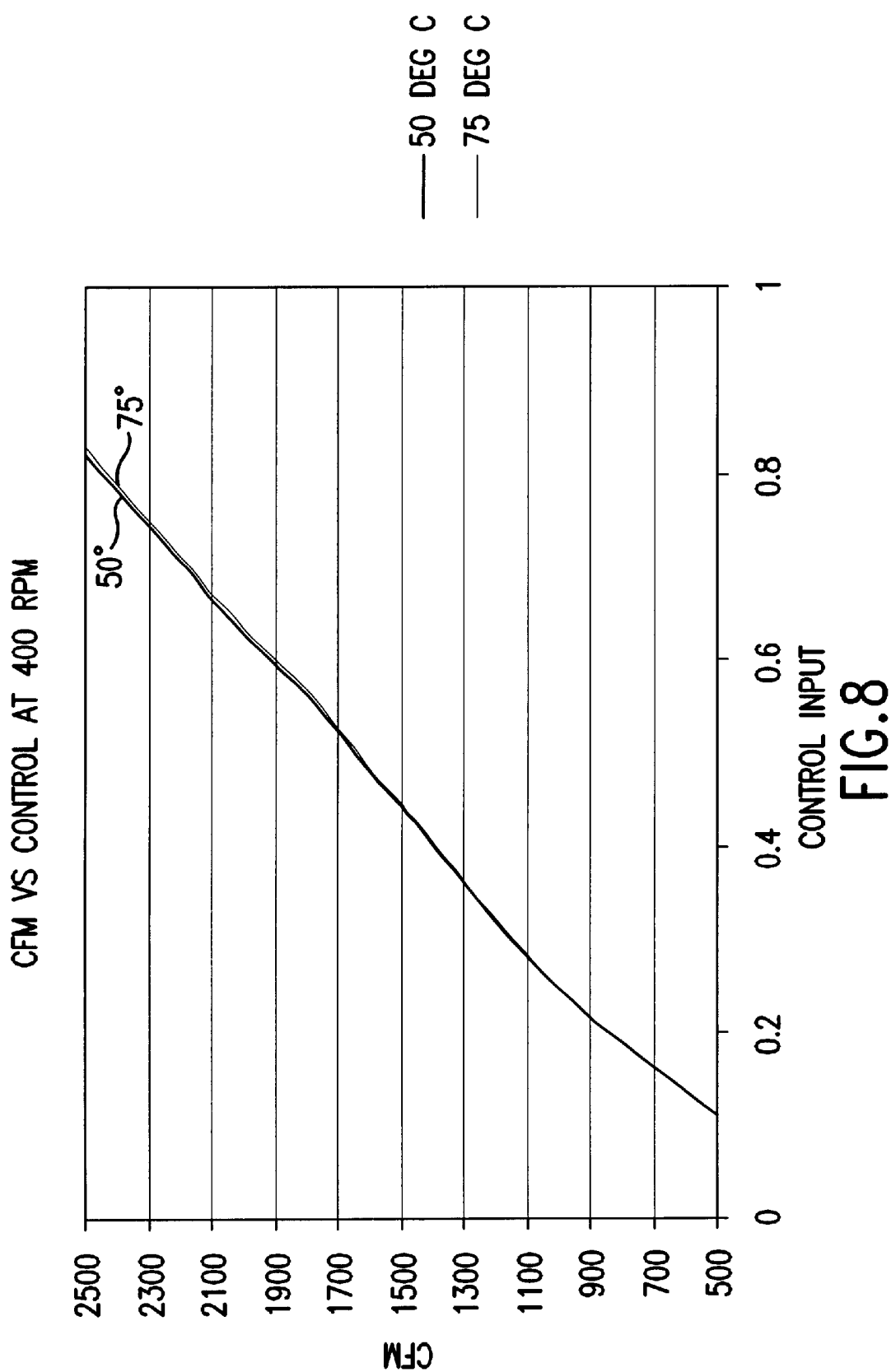
FIG. 8 is a graph of temperature effect on air flow at 400 RPM for the induction motor.
Figure 9:
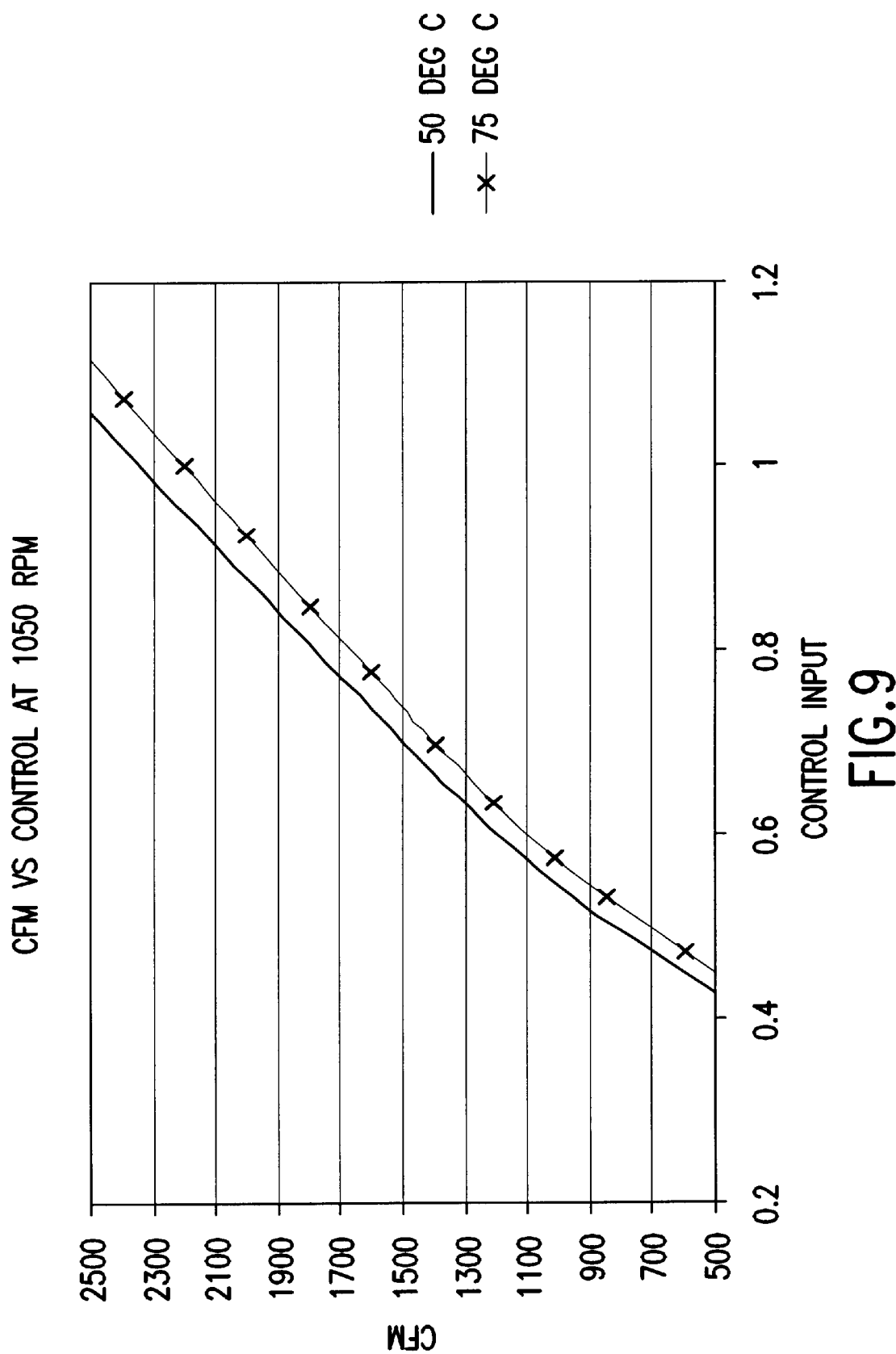
FIG. 9 is a graph of temperature effect on air flow at 1050 RPM for the induction motor.

Motor characteristics also vary with temperature, although the effect is not nearly as significant as with line voltage. The temperature characteristics of FIGS. 8 and 9 were calculated in Mathcad™ by varying the copper resistivity and the rotor resistance based upon the temperature coefficient of aluminum. CFM versus control input was then plotted at 50° C. and 75° C. for different RPM's. FIG. 8 is a plot for 400 RPM and FIG. 9 is a plot for 1050 RPM. Note that at 400 RPM the temperature effect is hardly discernible. At 1050 RPM, the effect of the 25° C. change is on the order of 8% to 10%. If this amount of error in air flow can be tolerated, then no correction for temperature should be necessary. It would be feasible to include a temperature correction by the addition of a temperature sensor to the motor as indicated in FIG. 1 at reference number 37. Since most commercial microprocessors with ADC's usually contain multiple ADC's, the additional cost may be minimal. Further testing to verify how well this temperature model agrees with real motor characteristics may need to be performed empirically.

A control method for constant CFM using an induction motor has been presented teaching inexpensive and robust control means to achieve the method. Novel apparatus and methods to achieve the present invention have been described. Persons skilled in the art shall appreciate that the details of the preferred embodiment described above can be changed or modified without departure from the spirit and scope of the invention which is to be limited only by the appended claims.

I claim:

1. A method of achieving a selected constant mass air flow rate for a blower motor of the induction type exhibiting nonlinearity between motor rotational speed, motor control voltage, and air flow rate, comprising:
   a) controlling motor speed through a motor controller by varying an excitation voltage to the motor;
   b) determining proportionality constants of flow rate to motor speed for various motor speeds over the operating range of the motor;
   c) providing a graph of curves for the various motor speeds plotted against the proportionality constants and the excitation voltages in a memory accessible by the motor controller;
   d) setting the controller at a first excitation voltage;
   e) measuring a rotational speed of the motor;
   f) deriving the proportionality constant for the measured motor speed to determine a fan speed corresponding to the selected air flow rate.

2. The method of achieving a constant mass air flow rate for a blower motor of the induction type according to claim 1 further comprising: adjusting the excitation voltage according to the determined fan speed to achieve the desired air flow.

3. The method of achieving a constant mass air flow rate for a blower motor of the induction type according to claim 2 further comprising: deriving a second proportionality constant according to a speed of the motor at the adjusted excitation voltage.

4. A method of achieving a constant mass air flow rate for a blower motor of the induction type exhibiting nonlinearity between motor rotational speed, motor control voltage, and air flow rate, comprising:
   a) controlling motor speed through a motor controller by varying an excitation voltage to the motor at selected control settings representative of varied excitation voltages;
   b) determining proportionality constants of flow rate to motor speed for various motor speed curves over an operating range of the motor;
   c) providing a graph of motor speed curves plotted against the proportionality constants of step b) and control settings of step a) in a memory accessible by the motor controller;
   d) setting the motor controller at a first setting for a selected constant mass air flow rate;
   e) measuring a rotational speed of the motor;
   f) deriving a proportionality constant for the measured motor speed to determine a control setting corresponding to the selected air flow;
   g) adjusting the RPM setting according to the proportionality constant of step f);
   h) adjusting the control setting to increase or decrease motor speed to achieve the desired RPM setting;
   i) deriving a second proportionality constant when the measured speed of the motor has achieved the desired RPM setting; and
   j) iteratively adjusting the rotational speed of the motor by repeating steps e)–g).

5. The method of achieving a constant mass air flow rate for a blower motor of the induction type of claim 4 further, comprising: checking the proportionality constant for the measured motor speed by interpolating between the curves to determine a control setting corresponding to the selected air flow.

6. Apparatus for achieving a constant mass air flow rate for a blower motor of the induction type exhibiting nonlinearity between motor rotational speed, motor control voltage, and air flow rate, comprising:
   a) a motor controller having a microprocessor for receiving a selected constant CFM rate value;
   b) a memory having stored therein motor speed curves plotted against proportionality constants of fan speed to air flow on a first axis and motor excitation voltages on a second axis, the memory operably connected to the microprocessor;
   c) means for controlling an excitation voltage to the motor, the means for controlling being operably connected to the microprocessor; and
   d) a tachometer for sensing the speed of the motor, the tachometer being operably connected to the microprocessor.

7. Apparatus for achieving a constant mass air flow rate for a blower motor of the induction type according to claim 6 further comprising: means for inputting variety of constant CFM rates.

8. Apparatus for achieving a constant mass air flow rate for a blower motor of the induction type according to claim 6 further comprising: means for sensing changes in a line voltage and adjusting excitation to the motor based on the changes in line voltage.

9. Apparatus for achieving a constant mass air flow rate for a blower motor of the induction type according to claim 6 further comprising: means for sensing temperature changes in the motor and adjusting excitation to the motor based on the changes in temperature.

10. Apparatus for achieving a constant mass air flow rate for a blower motor of the induction type according to claim 6 wherein the memory is a look up table.

11. Apparatus for achieving a constant mass air flow rate for a blower motor comprising:
    a) means for inputting a selected constant CFM rate to a motor controller;
    b) a motor controller having a microprocessor for receiving the input constant CFM rate;
    c) memory means having stored therein motor speed curves plotted against proportionality constants on a first axis and motor excitation voltages on a second axis, the memory means operably connected to the microprocessor;
    d) means for controlling the excitation voltage to the motor, the means for controlling operably connected to the microprocessor; and
    e) means for sensing a speed of the motor, the means for sensing a speed operably connected to the microprocessor.

12. The apparatus for achieving a constant mass air flow rate for a blower motor according to claim 11 further comprising: a motor of the induction type exhibiting non-linearity between motor rotational speed, motor control voltage, and air flow rate, the motor being operably connected to the tachometer and the motor controller.

13. A method for achieving a constant mass air flow rate for an induction blower motor according to claim 11 further comprising: performing an algorithm having the steps in order of:

a) select air flow rate value;
b) set motor speed value;
c) change control motor voltage until motor speed value is reached;
d) derive system constant for current control voltage and current motor speed value;
e) divide air flow rate value by derived system constant to derive new motor speed value; and
f) iterate steps c)–e) until motor speed value and system constant balance at selected air flow rate value.

14. A method for achieving a constant mass air flow rate for an induction blower motor according to claim 11 further comprising: performing an algorithm having the steps in order of:

a) enter air flow rate value;
b) set first motor speed value;
c) step motor control voltage until first motor speed value is measured;
d) derive first system constant for current motor control voltage and first motor speed value;
e) divide air flow rate value by first system constant to derive second motor speed value;
f) subtract second motor speed value-first motor speed value to derive third motor speed value;
g) divide third motor speed value by x to get fourth motor speed value;
h) step motor control voltage up until fourth motor speed value is measured;
i) derive second system constant for current motor control voltage and fourth motor speed value;
j) divide air flow rate value by second system constant to derive fifth motor speed value; and
k) iteratively step up motor control voltage, measure motor speed and step through motor speed values until motor speed value and system constant balance at air flow rate value.

* * * * *